United States Patent [19]

Merchant et al.

[11] Patent Number: 5,897,809
[45] Date of Patent: Apr. 27, 1999

[54] DECAFLUOROPENTANE COMPOSITIONS

[75] Inventors: Abid Nazarali Merchant, Wilmington, Del.; Barbara Haviland Minor, Elkton, Md.; Shoeb Akberali Moiyadi, Hockessin, Del.

[73] Assignee: E. I. du Pont de Nemours and Company, Wilmington, Del.

[21] Appl. No.: 08/850,969

[22] Filed: May 5, 1997

Related U.S. Application Data

[60] Provisional application No. 60/018,677, May 30, 1996.

[51] Int. Cl.$^6$ .............................. A62C 13/00; C11D 7/50; C09K 5/00
[52] U.S. Cl. ........................ 252/2; 252/67; 252/182.15; 252/364; 62/114; 134/12; 134/31; 134/38; 134/40; 510/412
[58] Field of Search .......................... 252/67, 2, 182.11, 252/182.15, 188.1, 364; 134/12, 31, 38, 40; 510/338, 408, 411, 412, 415; 62/114

[56] References Cited

U.S. PATENT DOCUMENTS

| | | | |
|---|---|---|---|
| 5,064,560 | 11/1991 | Merchant | 252/171 |
| 5,196,137 | 3/1993 | Merchant | 252/172 |
| 5,225,099 | 7/1993 | Basu et al. | 252/171 |
| 5,562,853 | 10/1996 | Minor et al. | 252/67 |
| 5,578,137 | 11/1996 | Shealy | 134/42 |

FOREIGN PATENT DOCUMENTS

| | | |
|---|---|---|
| 0610507 | 8/1994 | European Pat. Off. . |
| 6-017093 | 1/1994 | Japan . |
| 7-113098 | 5/1995 | Japan . |

OTHER PUBLICATIONS

WPIDS 95–196820, 1995.

*Primary Examiner*—Shean C. Wu

[57] ABSTRACT

Azeotropic or azeotrope-like compositions comprising effective amounts of 1,1,1,2,3,4,4,5,5,5-decafluoropentane and cyclohexane or 1,1,1,2,3,4,4,5,5,5-decafluoropentane, cyclohexane and acetone to form an azeotropic or azeotrope-like composition that are useful as cleaning agents, displacement drying agents, wipe solvents, refrigerants, aerosol propellants, heat transfer media, gaseous dielectrics, fire extinguishing agents, expansion agents for polyolefins and polyurethanes and as power cycle working fluids are described.

5 Claims, No Drawings

DECAFLUOROPENTANE COMPOSITIONS

CROSS-REFERENCE TO RELATED APPLICATION

This application claims the benefit of U.S. Provisional application Ser. No. 60/018,677, filed May 30, 1996.

FIELD OF THE INVENTION

This invention relates to compositions, or mixtures, of fluorinated hydrocarbons and more specifically to azeotropic or azeotrope-like compositions comprising effective amounts of 1,1,1,2,3,4,4,5,5,5-decafluoropentane and cyclohexane or 1,1,1,2,3,4,4,5,5,5-decafluoropentane, cyclohexane and acetone to form an azeotropic or azeotrope-like composition. Such compositions are useful as cleaning agents, wipe solvents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, wipe solvent applications and displacement drying agents.

BACKGROUND OF THE INVENTION

Fluorinated hydrocarbons have many uses, one of which is as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. Fluorinated hydrocarbons are also useful cleaning agents in vapor degreasing operations and in wipe solvent applications.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degrasing operations because the cleaning agent is generally redistilled and reused for final rinse cleaning.

Fluorinated hydrocarbons may also be used as refrigerants. In refrigeration applications, a refrigerant is often lost during operation through leaks in shaft seals, hose connections, solder joints, and broken lines. In addition, the refrigerant may be released to the atmosphere during maintenance procedures on refrigeration equipment. Accordingly, it is desirable to use a single fluorinated hydrocarbon or an azeotropic or azeotrope-like composition that includes one or more fluorinated hydrocarbons as a refrigerant. Some nonazeotropic compositions that include one or more fluorinated hydrocarbons may also be used as refrigerants, but they have the disadvantage of changing composition, or fractionating, when a portion of the refrigerant charge is leaked or discharged to the atmosphere. If a non-azeotropic composition contains a flammable component, the blend could become flammable because of such a change in composition. Refrigerant equipment operation could also be adversely affected due to the change in composition and vapor pressure that results from fractionation.

Azeotropic or azeotrope-like compositions of fluorinated hydrocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorinated hydrocarbons and azeotropic or azeotrope-like compositions of fluorinated hydrocarbons as propellant vapor pressure attenuators in aerosol systems. Azeotropic or azeotrope-like compositions, with their substantially constant compositions and vapor pressures, are useful as solvents and propellants in aerosols.

Azeotropic or azeotrope-like compositions that include fluorinated hydrocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricant on metal parts.

Azeotropic or azeotrope-like compositions that include fluorinated hydrocarbons are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

SUMMARY OF THE INVENTION

The present invention relates to the discovery of azeotropic or azeotrope-like compositions comprising mixtures of effective amounts of 1,1,1,2,3,4,4,5,5,5-decafluoropentane and cyclohexane or 1,1,1,2,3,4,4,5,5,5-decafluoropentane, cyclohexane and acetone to form an azeotropic or azeotrope-like composition.

DETAILED DESCRIPTION

The compositions of the instant invention are constant boiling, azeotropic or azeotrope-like compositions, or mixtures, comprising effective amounts of 1,1,1,2,3,4,4,5,5,5-decafluoropentane (HFC-43-10mee, $CF_3CHFCHFCF_2CF_3$, boiling point=54.6° C.), cyclohexane (—$CH_2CH_2CH_2CH_2CH_2CH_2$—, boiling point=80.7° C.) and acetone ($CH_3COCH_3$, boiling point=56.2° C.) to form an azeotropic or azeotrope-like composition.

Effective amounts of 1,1,1,2,3,4,4,5,5,5-decafluoropentane and cyclohexane or 1,1,1,2,3,4,4,5,5,5-decafluoropentane, cyclohexane and acetone to form an azeotropic or azeotrope-like composition, when defined in terms of weight percent of the components at a specific pressure or temperature, include the following:

Substantially constant-boiling, azeotropic or azeotrope-like compositions of HFC-43-10mee and cyclohexane comprise about 58 to 99 weight percent HFC-43-10mee and about 1 to 42 weight percent cyclohexane. These compositions boil at about 51° C., at substantially atmospheric pressure. A preferred composition comprises about 80 to 99 weight percent HFC-43-10mee and 1–20 weight percent cyclohexane. A more preferred composition is the azeotrope, which comprises about 87 weight percent HFC-43-10mee and about 13 weight percent cyclohexane, and which boils at about 51° C., at substantially atmospheric pressure.

Substantially constant-boiling, azeotropic or azeotrope-like compositions of HFC-43-10mee, cyclohexane and acetone comprise about 1 to 98 weight percent HFC-43-10mee, about 1 to 65 weight percent cyclohexane and about 1–98 weight percent acetone. These compositions boil at about 56° C., at substantially atmospheric pressure. A preferred composition comprises about 40 to 98 weight percent HFC-43-10mee, 1 to 40 weight percent cyclohexane and about 1 to 40 weight percent acetone. A more preferred composition comprises about 49 weight percent HFC-43-10mee, about 26 weight percent cyclohexane and about 25 weight percent acetone, and which boils at about 56° C., at substantially atmospheric pressure. A most preferred composition for optimum cleaning is 85 weight percent HFC-43-10mee, 5 weight percent cyclohexane, and 10 weight percent acetone.

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at pressures other than the pressure described herein.

By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of the following criteria:

(a) The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition, (b) It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes, (c) The composition can be defined as a particular weight percent relationship or mole percent relationship of A, B, C (and D . . . while recognizing that such specific values point out only one particular relationship and that in actuality, a series of such relationships, represented by A, B, C (and D . . . ) actually exist for a given azeotrope, varied by the influence of pressure, or (d) An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The following binary and ternary compositions are characterized as azeotropic or azeotrope-like in that mixtures within this range exhibit a substantially constant boiling point at substantially atmospheric pressure. Being substantially constant boiling, the mixtures do not tend to fractionate to any great extent upon evaporation. After evaporation, only a small difference exists between the composition of the vapor and the composition of the initial liquid phase. This difference is such that the compositions of the vapor and liquid phases are considered substantially identical. Accordingly, any compositions within this range exhibit properties which are characteristic of true binary and ternary azeotropic or azeotrope-like mixtures.

1. About 58 to 99 weight percent HFC-43-10mee and about 1 to 42 weight percent cyclohexane; and preferably about 80 to 99 weight percent HFC-43-10-mee and about 1 to 20 weight percent cyclohexane; and 2. About 1 to 98 weight percent HFC-43-10mee, about 1 to 65 weight percent cyclohexane and about 1 to 98 weight percent acetone; and preferably about 40 to 98 weight percent HFC-43-10mee, about 1 to 40 weight percent cyclohexane and about 1 to 40 weight percent acetone.

The following binary and ternary compositions are established as true binary and ternary azeotropic or azeotrope-like mixtures at substantially atmospheric pressure.

1. About 87 weight percent HFC-43-10mee and about 13 weight percent cyclohexane; and 2. About 49 weight percent HFC-43-10mee, about 26 weight percent cyclohexane and about 25 weight percent acetone.

The aforestated azeotropes have zero ozone-depletion potential.

The azeotropic or azeotrope-like compositions of the instant invention permit easy recovery and reuse of the solvent from vapor defluxing and degreasing operations because of their azeotropic natures. As an example, the azeotropic mixtures of this invention can be used in cleaning processes such as described in U.S. Pat. No. 3,881,949, or as a buffing abrasive detergent.

In addition, the mixtures are useful as resist developers, where chlorine-type developers would be used, and as resist stripping agents with the addition of appropriate halocarbons and as wipe solvent applications.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be heated and thereafter evaporating the refrigerant.

A further aspect of the invention includes aerosol compositions comprising an active agent and a propellant, wherein the propellant is an azeotropic mixture of the invention; and the production of these compositions by combining said ingredients. The invention further comprises cleaning solvent compositions comprising the azeotropic mixtures of the invention.

The azeotropic or azeotrope-like compositions of the instant invention can be prepared by any convenient method including mixing or combining the desired component amounts. A preferred method is to weigh the desired component amounts and thereafter combine them in an appropriate container.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

EXAMPLE 1

Impact of Vapor Leakage on Vapor Pressure

A vessel is charged with an initial composition, and the initial vapor pressure of the composition is measured. The composition is allowed to leak from the vessel, while the temperature is held constant, until 50 weight percent of the initial composition is removed, at which time the vapor pressure of the composition remaining in the vessel is measured. The results are summarized below.

TABLE 1

|  | 0 wt % | 50 wt % | Delta P % |
|---|---|---|---|
| HFC-43-10mee/cyclohexane (51° C.) | | | |
| 87/13 | 14.64 | 14.64 | 0.0 |
| 95/5 | 14.31 | 14.00 | 2.2 |
| 99/1 | 13.33 | 13.07 | 2.0 |
| 70/30 | 14.31 | 13.93 | 2.7 |
| 60/40 | 14.11 | 13.54 | 4.0 |
| 58/42 | 14.07 | 13.37 | 5.0 |
| HFC-43-10mee/cyclohexane/acetone (56° C.) | | | |
| 49/26/25 | 14.68 | 14.68 | 0.0 |
| 60/20/20 | 14.74 | 14.68 | 0.4 |
| 85/5/10 | 14.84 | 13.97 | 5.9 |
| 82/8/10 | 15.22 | 14.54 | 4.5 |
| 90/9/1 | 17.19 | 17.00 | 1.1 |
| 90/5/5 | 15.78 | 14.98 | 5.1 |
| 98/1/1 | 15.69 | 15.29 | 2.5 |
| 80/19/1 | 17.16 | 16.94 | 1.3 |
| 70/29/1 | 16.89 | 16.34 | 3.3 |
| 60/39/1 | 16.62 | 15.71 | 5.5 |
| 1/1/98 | 14.69 | 14.62 | 0.5 |
| 1/20/79 | 15.77 | 15.66 | 0.7 |
| 1/50/49 | 15.62 | 15.32 | 1.9 |
| 1/65/34 | 15.14 | 13.82 | 8.7 |
| 40/50/10 | 14.72 | 13.41 | 8.9 |
| 60/30/10 | 15.27 | 14.88 | 2.6 |

EXAMPLE 2

A suitable container was filled with 85 weight percent HFC-43-10mee, 5 weight percent cyclohexane and 10 weight percent acetone. The mixture was evaporated at room temperature and the composition in the container measured during the evaporation as shown in Table 2. The results show the concentration of HFC-43-10mee remains at around 85 weight percent throughout the evaporation. These mixtures are considered to have very low or no flammability.

TABLE 2

|  | HFC-43-10mee | Cyclohexane | Acetone |
|---|---|---|---|
| Batch | 84.94 | 5.06 | 10.00 |
| 10% Cut | 86.32 | .003 | 13.68 |
| 30% Cut | 87.23 | 0.21 | 12.56 |
| 50% Cut | 87.33 | 0.77 | 11.90 |
| 70% Cut | 86.58 | 2.42 | 11.00 |
| 90% Cut | 85.57 | 4.13 | 10.30 |

EXAMPLE 3

A suitable container was filled with 82 weight percent HFC-43-10mee, 8 weight percent cyclohexane and 10 weight percent acetone. The mixture was evaporated at room temperature and the composition in the container measured during the evaporation as shown in Table 3. The results show the concentration of HFC-43-10mee remains at least 84 weight percent when up to 70 percent of the mixture is evaporated. These mixtures are considered to have very low or no flammability.

TABLE 3

|  | HFC-43-10mee | Cyclohexane | Acetone |
|---|---|---|---|
| Batch | 81.93 | 8.04 | 10.03 |
| 10% Cut | 85.90 | .002 | 14.10 |
| 30% Cut | 86.54 | 0.53 | 12.93 |
| 50% Cut | 85.64 | 2.39 | 11.97 |
| 70% Cut | 84.38 | 4.35 | 11.27 |
| 90% Cut | 82.69 | 6.92 | 10.39 |

EXAMPLE 4

A suitable container was filled with 82 weight percent HFC-43-10mee, 5 weight percent cyclohexane and 13 weight percent acetone. The mixture was evaporated at room temperature and the composition in the container measured during the evaporation as shown in Table 4. The results show the concentration of HFC-43-10mee remains around 84 weight percent when up to 70 percent of the mixture is evaporated. These mixtures are considered to have very low or no flammability.

TABLE 4

|  | HFC-43-10mee | Cyclohexane | Acetone |
|---|---|---|---|
| Batch | 81.97 | 5.04 | 12.99 |
| 10% Cut | 85.37 | — | 14.63 |
| 30% Cut | 85.35 | 0.11 | 14.54 |
| 50% Cut | 85.00 | 0.83 | 14.17 |
| 70% Cut | 84.11 | 2.07 | 13.82 |
| 90% Cut | 82.70 | 4.01 | 13.29 |

EXAMPLE 5

The following Kauri-butanol (KB) values were measured indicating these mixtures have good solvency.

TABLE 5

|  | KB Value |
|---|---|
| HFC-43-10mee/Cyclohexane/Acetone |  |
| 85/5/10 | 12.8 |
| 82/8/10 | 13.2 |
| 82/5/13 | 13.1 |

EXAMPLE 6

Oil Removal

Hardcut 541 oil was applied to pre-weighed glass slides and metal coupons. The contaminated slides and coupons were weighed, then cleaned with a mixture of 85 weight percent HFC-43-10mee, 5 weight percent cyclohexane and 10 weight percent acetone by either mechanically hand wiping the substrate or by spraying for 30 seconds and allowing to dry. Substrates were then re-weighed and inspected by two methods—visually and under ultra violet (UV) light. Results are shown in Table 6.

TABLE 6

|  | Initial Substrate Wt. (g) | Wt. of Substrate Plus Oil | Wt. After Cleaning | Cleaning Method and Inspection of Residue |
|---|---|---|---|---|
| Glass slide | 5.8046 | 5.8141 | 5.8053 | Hand Wipe<br>Visual: slight film<br>UV light: slight film |
|  |  |  | 5.8046 | Spray and Dry<br>Visual: no residue<br>UV light: no residue |
| Metal coupon | 4.0816 | 4.1846 | 4.0827 | Hand Wipe<br>Visual: slight film<br>UV light: slight film |
|  |  |  | 4.0821 | Spray and Dry<br>Visual: no residue<br>UV light: no residue |

EXAMPLE 7

Fingerprint Removal

Human fingerprints were applied to pre-weighed glass slides, metal coupons and cellular film. The contaminated substrates were weighed, then cleaned with a mixture of 85 weight percent HFC-43 -10mee, 5 weight percent cyclohexane and 10 weight percent acetone using at least one of three cleaning methods—mechanical hand wiping; spraying for 30 seconds and air drying; or soaking for 5 minutes and air drying. Substrates were then re-weighed and visually inspected. Results are shown in Table 7.

TABLE 7

|  | Initial Substrate Wt. (g) | Wt. of Substrate/ Fingerprint | Wt. After Cleaning | Cleaning Method and Inspection of Residue |
|---|---|---|---|---|
| Glass slide | 5.8248 | 5.8251 | 5.8249<br>5.8248<br>5.8248 | Hand: slight residue<br>Spray: slight residue<br>Soak: slight residue |
| Metal coupon | 4.0809 | 4.0811 | 4.0809 | Hand: no residue |
| Cellu. film | 0.3128 | 0.3129 | 0.3128 | Hand: no residue |

Results show a composition of the present invention can remove fingerprint contamination, particularly from metal and cellular film.

EXAMPLE 8

Particulate Removal

Talc was applied to pre-weighed glass slides, metal coupons and cellular film. The contaminated substrates were weighed, then cleaned by mechanically hand wiping with a mixture of 85 weight percent HFC-43-10mee, 5 weight percent cyclohexane and 10 weight percent acetone. Substrates were then re-weighed and visually inspected . Results are shown in Table 8.

TABLE 8

|  | Initial Substrate Wt. (g) | Wt. of Substrate/ Particul. | Wt. After Cleaning | Cleaning Method and Inspection of Residue |
|---|---|---|---|---|
| Glass slide | 6.0740 | 6.0777 | 6.0740 | Hand: no residue |
| Metal coupon | 4.1476 | 4.1495 | 4.1476 | Hand: no residue |
| Cellu. film | 0.3140 | 0.3144 | 0.3140 | Hand: no residue |

Results show a composition of the present invention completely remove particulates from different substrates using only mechanical wiping.

EXAMPLE 9

Tape Residue Removal

Duct and masking tape were affixed to pre-weighed glass slides then removed leaving a residue. The slides were weighed, then cleaned with a mixture of 85 weight percent HFC-43-10mee, 5 weight percent cyclohexane and 10 weight percent acetone using at least one of three different cleaning methods—mechanically hand wiping; spraying for 30 seconds and air drying; or soaking for 5 minutes and air drying. The slides were then re-weighed and visually inspected. Results are shown in Table 9.

TABLE 9

|  | Initial Substrate Wt. (g) | Wt. of Substrate/ Tape Res. | Wt. After Cleaning | Cleaning Method and Inspection of Residue |
|---|---|---|---|---|
| Duct | 5.5783 | 5.5791 | 5.5786 | Hand: slight residue |
|  |  |  | 5.5786 | Spray: slight residue |
|  |  |  | 5.5786 | Soak: slight residue |
| Masking | 5.7029 | 5.7037 | 5.7036 | Hand: slight residue |
|  |  |  | 5.7036 | Spray: slight residue |
|  |  |  | 5.7036 | Soak: slight residue |

Results show tape residue can be partially removed using a composition of the present invention.

ADDITIONAL COMPOUNDS

Other components, such as aliphatic hydrocarbons having a boiling point of 0–100° C., hydrofluorocarbonalkanes having a boiling point of 0–100° C., hydrofluoropropanes having a boiling point of between 0–100° C., hydrocarbon esters having a boiling point between 0–100° C., hydrochlorofluorocarbons having a boiling point between 0–100° C., hydrofluorocarbons having a boiling point of 0–100° C., hydrochlorocarbons having a boiling point between 0–100° C., chlorocarbons and perfluorinated compounds, can be added to the azeotropic or azeotrope-like compositions described above without substantially changing the properties thereof, including the constant boiling behavior, of the compositions. Examples of such components, which typically do not exceed about 10 weight percent of the total composition, include the following:

| COMPOUND | FORMULA | boiling point, ° C. |
|---|---|---|
| HCFC-123 | $CHCl_2CF_3$ | 27 |
| HCFC-141b | $CFCl_2CH_3$ | 32 |
| HCFC-225aa | $CHF_2CCl_2CF_3$ | 53 |
| HCFC-225ca | $CHCl_2CF_2CF_3$ | 52 |
| HCFC-225cb | $CHClFCF_2CF_2Cl$ | 56 |
| HCFC-225da | $CClF_2CHClCF_3$ | 50 |
| HFC-HFC-43-10mf | $CF_3CH_2CF_2CF_2CF_3$ | 52 |
| HFC-HFC-43-10mcf | $CF_3CF_2CH_2CF_2CF_3$ | 52 |
| FC-C-51-12 | cyclo-$C_4F_6(CF_3)_2$ | 45 |
|  | $CH_3OCF_2CHFCF_3$ | 52 |
| HFC-C-456myc | cyclo-$CH_2CH_2CF_2CF(CF_3)$ |  |
| HFC-C-354 | cyclo-$CF_2CF_2CH_2CH_2$ | 50 |
|  | $C_4F_9CH=CH_2$ | 58 |
| MEK | $CH_3C(O)C_2H_5$ | 80 |
| THF | cyclo-$OC_4H_8$ | 66 |
| methyl formate | $HC(O)OCH_3$ | 32 |
| ethyl formate | $HC(O)OC_2H_5$ | 54 |
| methyl acetate | $CH_3C(O)OCH_3$ | 56 |
| ethyl acetate | $CH_3C(O)OC_2H_5$ | 77 |
| 1,2-dichloroethane |  | 84 |
| acetonitrile |  | 82 |
| methylene chloride |  | 40 |

Additives such as lubricants, corrosion inhibitors, stabilizers, surfactants, dyes and other appropriate materials may be added to the novel compositions of the invention for a variety of purposes provided they do not have an adverse influence on the composition, for their intended applications. Examples of stabilizers include nitromethane and nitroethane.

What is claimed is:

1. A composition comprising 40 to 98 weight percent 1,1,1,2,3,4,4,5,5,5-decafluoropentane, 1 to 40 weight percent cyclohexane and 1 to 40 weight percent acetone to form at substantially atmospheric pressure an azeotropic or azeotrope-like composition of which the change in vapor pressure is less than 10 percent after 50 percent has been allowed to evaporate.

2. The composition of claim 1, comprising 85 weight percent of 1,1,1,2,3,4,4,5,5,5-decafluoropentane, 5 weight percent cyclohexane, and 10 weight percent acetone.

3. A process for cleaning a solid surface comprising treating said surface with a composition of claim 2.

4. A process for preparing a thermoset or thermoplastic foam, comprising using a composition of claim 2 as a blowing agent.

5. A process to produce for atomizing a fluid comprising using a composition of claim 2 as an aerosol propellant.

* * * * *